Nov. 15, 1938.  C. A. CAMPBELL  2,136,579
FLUID PRESSURE BRAKE
Filed July 19, 1934  2 Sheets-Sheet 2

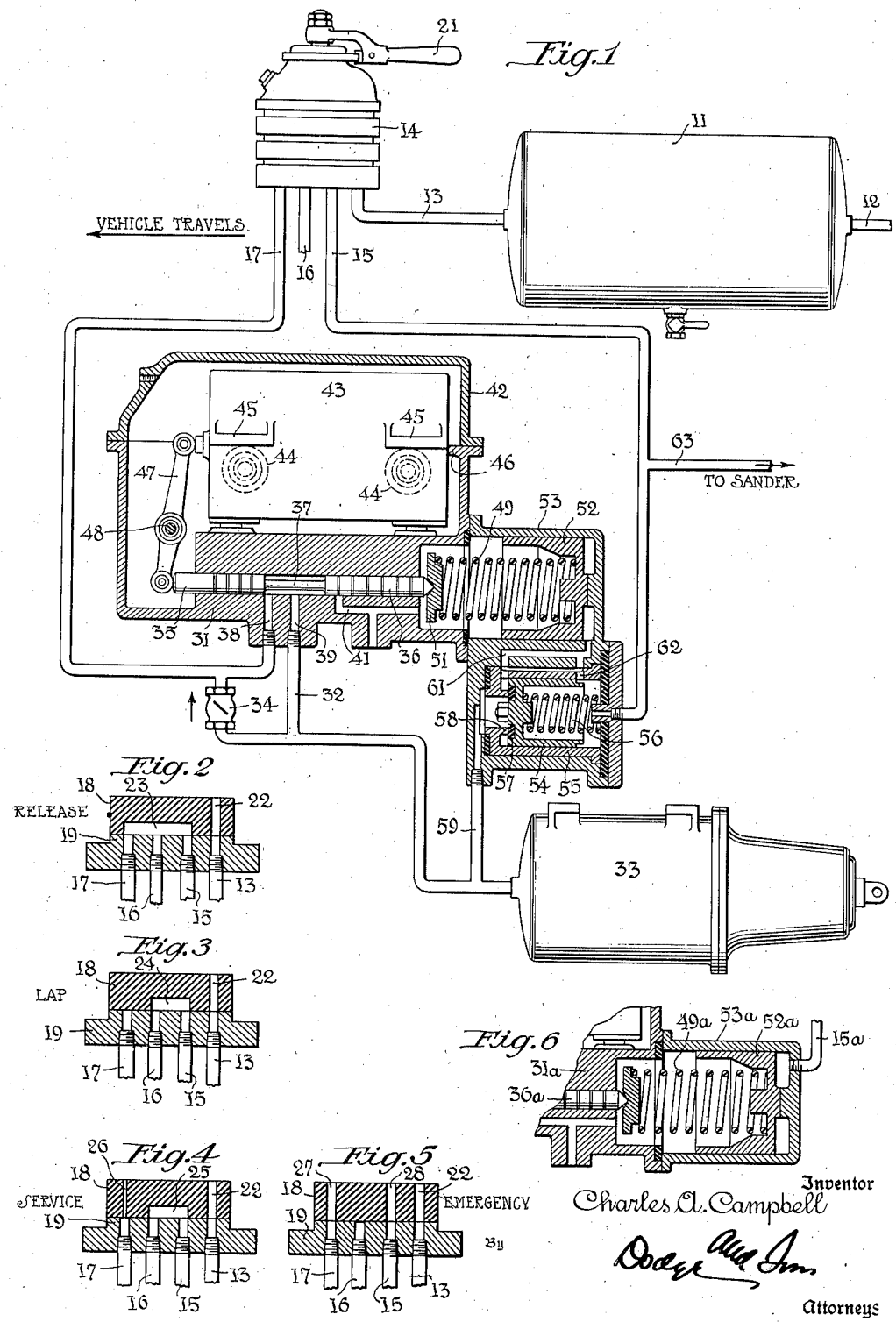

Inventor
Charles A. Campbell
Attorneys

Patented Nov. 15, 1938

2,136,579

UNITED STATES PATENT OFFICE 2,136,579

FLUID PRESSURE BRAKE

Charles A. Campbell, Watertown, N. Y., assignor to The New York Air Brake Company, a corporation of New Jersey Application July 19, 1934, Serial No. 736,068

14 Claims. (Cl. 303—24)

This invention relates to power actuated brakes of the type in which the brake application is modulated by means responsive to the rate of deceleration produced by the brake application. Such modulating devices are commonly called decelerometers or deceleration controllers. The invention is applicable to power brakes generally irrespective of the power medium used.

Broadly stated the invention contemplates such control of the decelerometer by the brake controller, for example the engineer's brake valve, that different braking characteristics, particularly as to the rate of deceleration, are secured in emergency position of such controller and in service position thereof.

The preferred embodiment of the invention involves its application to a known type of pneumatic system (not herein broadly claimed, and of which there are various specifically different embodiments) in which the deceleration rate is automatically reduced as a state of rest is approached, so that a smooth final stop is secured. As applied to such a system the invention serves to inhibit the change (reduction) of decelerative rate when the engineer's brake valve is in emergency position and to permit it to occur when the engineer's brake valve is in service application position, or is in lap position after manipulation to effect an application of either service or emergency type.

The effect is to ensure the shortest practicable stop under emergency conditions, while assuring smoother, but somewhat longer service stops.

The invention is applicable to automatic, as well as straight air systems in the fluid pressure brake field, and examples of such embodiments will be described. Straight air systems commonly include one or more relays interposed between the engineer's brake valve and the brake cylinder (or cylinders) but since the presence or absence of the relays does not affect the operative principle of the invention, all relays are omitted from the illustrated straight air systems in the interest of a simple disclosure.

In the accompanying drawings:

Fig. 1 is a diagrammatic view, partly in elevation and partly in section, showing a straight air system for a single vehicle.

Fig. 2 is a diagrammatic section of the engineer's brake valve indicating the connections established in release position.

Fig. 3 is a similar view showing lap position.

Fig. 4 is a similar view showing service application position.

Fig. 5 is a similar view showing emergency application position.

Fig. 6 is a fragmentary view similar to a portion of Fig. 1 and showing a modification.

Figure 7:
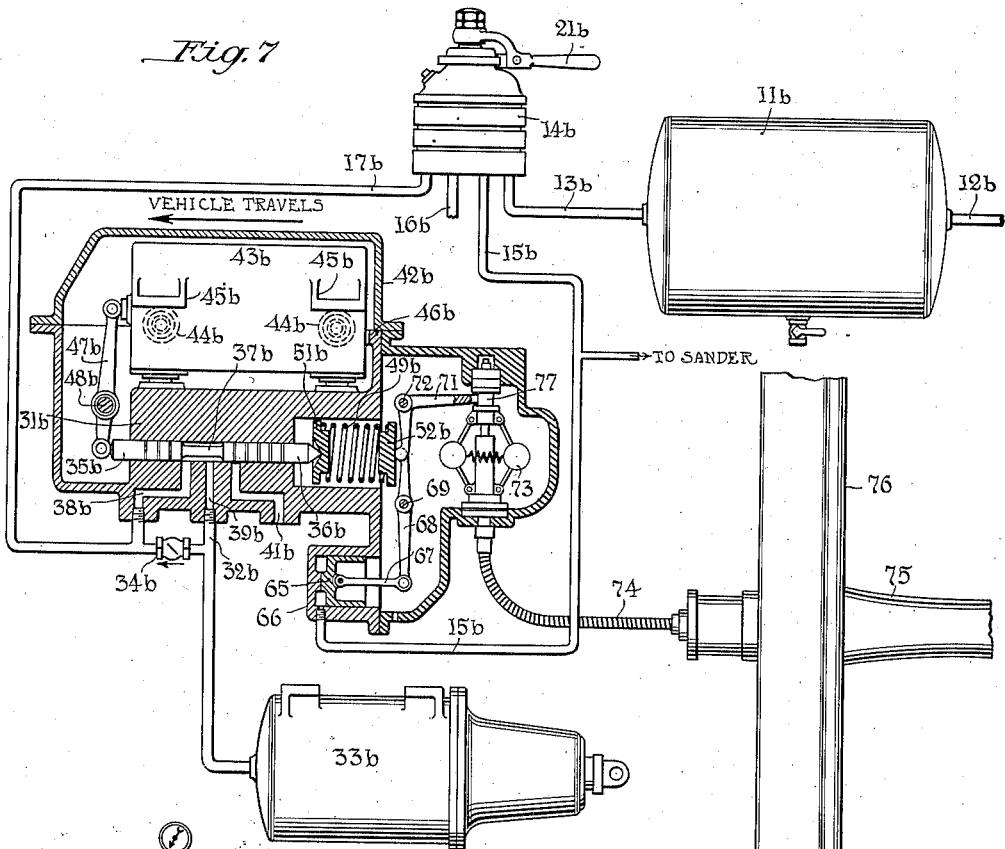
Fig. 7 is a view similar to Fig. 1, showing a modification using combined speed and deceleration control.

Referring to Fig. 1, the main reservoir is indicated at 11 and is supplied with air under pressure through connection 12. The reservoir is typical of any suitable source of pressure fluid.

The reservoir 11 is connected by pipe 13 with the body 14 of the engineer's brake valve, which offers connections for three other pipes, a sander pipe 15, exhaust pipe 16, and brake pipe 17. The brake valve includes a rotary valve 18 on a seat 19 formed with ports, to which the pipes 13, 15, 16 and 17 lead (see Figs. 2 to 5).

The rotary valve 18 may be turned by handle 21 to four characteristic positions, in all of which an arcuate through port 22 in valve 18 registers with the port from pipe 13 and thus admits main reservoir air to the space above valve 18.

In "release position," Fig. 2, a cavity, indicated at 23, vents pipes 15 and 17 through exhaust pipe 16.

In "lap position," Fig. 3, a cavity, indicated at 24, vents pipe 15 through pipe 16, the port to pipe 17 being blanked by valve 18.

In "service position," Fig. 4, a cavity, indicated at 25, vents pipe 15 through pipe 16 and a restricted port 26 feeds main reservoir air from the space above valve 18 to the brake pipe 17.

In "emergency position," Fig. 5, ports 27 and 28 feed main reservoir air from the space above valve 18 freely to brake pipe 17 and sander pipe 15 and the port leading to exhaust pipe 16 is blanked.

In Figs. 2 to 5 the showing is diagrammatic and the cavities 23, 24, 25, can and commonly would be merely different positions of a single specially shaped cavity. Conventional brake valves can be used, since the functions diagrammed in Figs. 2 to 5 are known in the art.

Brake pipe 17 leads to the body 31 of the deceleration controller and from body 31 a pipe 32 leads to brake cylinder 33. A check valve 34 connects pipes 17 and 32, permitting releasing flow to bypass the decelerometer when the engineer's brake valve is in release position, while constraining applying flow to pass through the decelerometer.

In the body 31 is a cylindrical valve seat or chamber for a piston valve. This valve comprises two spaced heads 35, 36, which seal in the chamber and slide freely therein, and which are connected by a reduced middle portion 37 so that they move in unison. The valve controls three ports in the seat, namely, a supply port 38 to which brake pipe 17 leads, a port 39 to which pipe 32 is connected and an exhaust port 41.

The heads 35, 36 are so spaced and the ports 38, 39 and 41 are so located that the valve connects port 39 selectively with ports 38 and 41 and in mid position isolates it from both by slightly lapping ports 38 and 41.

Thus the valve is a balanced piston valve of the inside cut off type, and has a slight inside lap.

Mounted beneath cap 42 on housing 31 is the inertia mass 43. This is guided to move in the direction of travel of the vehicle whose brakes are to be controlled, by means of antifriction rollers 44 which engage longitudinal flanges or tracks 45 on the mass 43.

The direction of travel of the vehicle is indicated by an arrow and legend on Fig. 1.

The normal (rearward) position of mass 43 relatively to the vehicle is defined by stop 46. Forward motion of the mass occasioned by deceleration of the vehicle shifts valve 35—36 through lever 47 fulcrumed at 48. The lever engages the forward end of mass 43 at its upper end and the forward end of head 35 at its lower end.

Rearward motion of valve 35—36 is yieldingly resisted by coil compression spring 49 which reacts at its forward end against the valve head 36 through spring seat 51. The spring is sustained at its rear end by a combined piston and spring seat 52 shiftable a definite distance in cylinder 53. When piston 52 is in its rear position, as shown in Fig. 1, the decelerometer is set to maintain a low deceleration rate because the loading of spring 49 is relatively low. When piston 52 is forced to its forward limit of motion the spring is more heavily loaded and the deceleration rate is higher in consequence.

The position of piston 52 is controlled by the position of a combined piston and valve 54 mounted in cylinder 55. The piston 54 is urged by spring 56 so that annular gasket 57 seals on seat rib 58. A branch connection 59 from pipe 32 subjects the portion of piston 54 within seat 58 constantly to brake cylinder pressure. When brake cylinder pressure is sufficient to shift piston 54 away from seat rib 58, the whole area of piston 54 is exposed to brake cylinder pressure, so that the piston then moves quickly to its limit of motion.

A port 61 leads from the working space in cylinder 53 to the annular space outside seat 58. A branch 62 of this port is controlled by the outer (rear) end of piston 54. The sander pipe 15 is connected to the space at the rear of piston 54 and exhaust flow from cylinder 53 must pass by way of this pipe.

The operation of the embodiment shown in Figs. 1–5 can now be explained.

With brakes released and the vehicle in motion, the parts are positioned as shown in Figs. 1 and 2.

To produce a service application, the engineer shifts the brake valve from release position (Fig. 2) to service position (Fig. 4). He may leave it in service position or may shift it to lap position (Fig. 3) to set a limit on the initial application.

In either case the rise of brake cylinder pressure shifts piston 54 to admit pressure fluid behind piston 52 and load spring 49 for the maximum decelerative rate.

When the deceleration rate attains a value such that the inertia force exerted by mass 43 overpowers spring 49, first valve head 35 will blank port 38 and then head 36 will expose port 41, so that ports 39 and 41 are connected. This cuts the engineer's brake valve off, so that it cannot further increase the intensity of application (but can still, if moved to release position, release the application by flow through check valve 34). At the same time the brake cylinder is vented gradually to atmosphere.

Since the coefficient of brake shoe friction increases as the train slows down, the decelerometer will graduate exhaust flow to maintain a uniform decelerative rate. Consequently, brake cylinder pressure is gradually reduced and ultimately reaches a value so low that piston 54 is shifted by spring 56 to isolate cylinder 53 from brake cylinder 33, and vent the pressure fluid from cylinder 53 to atmosphere via port 62, pipe 15, cavity 24 (Fig. 3) or cavity 25 (Fig. 4) and exhaust pipe 16.

The venting of cylinder 53 allows piston 52 to retreat and reduce the loading of spring 49 so that the decelerometer functions to maintain a lower deceleration rate. The parts are so arranged that this reduction of decelerative rate occurs in the last stages of the stop.

If the engineer shifts the brake valve to emergency position and leaves it there, pipe 15 is connected to main reservoir and not to atmosphere, as in service and lap positions. Consequently piston 54 is held in the position shown in Fig. 1 and main reservoir air flows to cylinder 53 by way of pipe 15 and port 62, displacing piston 52 and holding spring 49 under maximum stress throughout the stop.

If the engineer shifts from emergency position to service or lap positions, the pistons 52 and 54 are thereupon conditioned to function as already described.

In Fig. 1 a branch 63 is indicated as leading to a sander. Ordinarily the admission of main reservoir air to this branch actuates a sander by energizing a valve opening motor, or by some other suitable arrangement.

A very simple embodiment of the broad inventive concept is shown in Fig. 6. Except as hereinafter stated all parts are as shown in Figs. 1–5 inclusive. In the arrangement of Fig. 6 the parts 54 to 62 inclusive are omitted, and pipe 15 is connected directly to a motor cylinder 53a (similar to cylinder 53) so that the brake valve directly controls the admission and exhaust of pressure fluid to and from this cylinder. Thus in emergency position piston 52a (similar to piston 52) shifts to stress spring 49 heavily. In service, lap and release positions, cylinder 53a is vented and spring 49 is less heavily loaded.

The arrangement of Fig. 6 gives a relatively high decelerative rate as long as the brake valve is in emergency position, and a relatively lower decelerative rate in service and lap positions.

Referring back to the device of Fig. 1, the modification of the adjustment of the decelerometer is in a sense responsive to vehicle speed. It responds directly to braking pressure and the braking pressure is reduced under conditions of uniform deceleration as train speed is reduced, for the reason that the coefficient of brake shoe friction increases as train speed is reduced.

In Fig. 7 a construction is shown in which the adjustment is controlled directly by vehicle speed. In this figure the parts 11b to 17b and also 21b are identical with corresponding parts of Fig. 1. The rotary valve is identical with the rotary valve illustrated in Figs. 2 to 5. Similarly the parts 31b to 51b are essentially identical with similarly numbered parts in Fig. 1, the letter "b" being used to indicate substantial but not necessarily absolute identity.

The rear end of the spring 49b is sustained by an adjustable spring seat 52b, and this may be adjusted by either of two means. First, a piston 65 and a cylinder 66 whose working space is connected to the pipe 15b. The piston 65 reacts through a link 67 and lever 68 upon the spring seat 52b, the lever 68 being fulcrumed at 69. Independently of this adjustment the spring seat 52 may be adjusted through a bell crank 71 fulcrumed at 72 by means of a speed responsive governor indicated at 73 and driven through a flexible shaft 74 from the axle 75 of one of the vehicle wheels 76. The governor 73 is shown as of the flyball type, and shifts a collar 77 in response to change of vehicle speed. While the range of adjustment permitted the governor 73 may be anything considered desirable, it is preferred so to limit the motion of the collar 77 in its response to the governor that the collar 77 shifts upward when the vehicle passes below a rather low critical speed, say five miles per hour. At all speeds above this critical value the collar is held in its lowermost position, imposing the maximum stress on the loading spring 49b.

With the parts so adjusted the governor will act to reduce the loading of the decelerometer as the train approaches a state of rest.

The function of the piston 65 is to maintain the loading of the decelerometer at the maximum value throughout the stop if the engineer's brake valve handle 21b be left in emergency position.

Arranged as just described the embodiment illustrated in Fig. 7 functions to produce essentially the type of control produced by the embodiment of Fig. 1, but by giving the collar 77 wider range of motion, it is possible to modify the controlling action of the decelerometer throughout a considerable range of vehicle speed.

Figure 8:
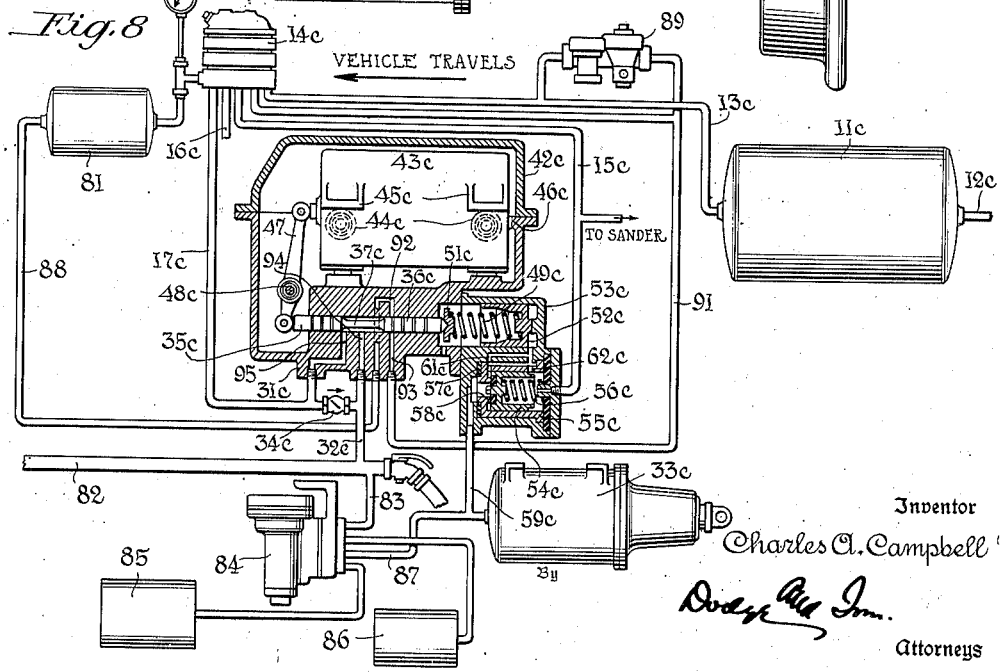
Fig. 8 is a view similar to Fig. 1, showing one way of applying the invention to an automatic air brake system.

Fig. 8 shows the application of the invention to an automatic system. In this case the main reservoir 11c receives compressed air from any source through the connection 12c and delivers it through pipe 13c to the body of an engineer's brake valve 14c, which in this instance is of the equalizing discharge type. Such valves include a rotary valve and customarily have a sanding port controlled by the rotary valve in such a way as to be vented to atmosphere in all positions except emergency, and subject to main reservoir pressure in emergency position. Thus while the rotary valve is specifically different from that shown in Figs. 2 to 5, it conforms to standard practice in the automatic brake art and performs the function of admitting main reservoir air to the sander pipe 15c in emergency position, and the function of venting the sander pipe 15c in all other positions. The brake valve has an exhaust connection 16c and a brake pipe connection 17c. This leads to the body 31c of the decelerometer. Leading from the decelerometer is a connection 32c which leads to the automatic brake pipe, hereinafter described.

In its mechanical aspects the decelerometer conforms to the structure already described. There is a check valve 34c which is interposed between the pipes 17c and 32c, but in this case is reversely arranged to allow the engineer's brake valve 14c to feed air to the brake pipe to release the brake.

The parts 35c to 37c and 42c to 61c correspond in detail to similarly numbered parts of Fig. 1. The sander pipe 15c is connected as already described. The pipe 59c is connected to the brake cylinder of the leading vehicle of the train.

The ports controlled by the valve heads 35c and 36c are necessarily different because of the use of an automatic system, and will now be described.

Since the valve 14c is of the equalizing discharge type, it includes an equalizing reservoir 81. As will be readily understood by those skilled in the art, the rotary valve of the engineer's brake valve is shifted by the usual handle, and, among other functions, serves to charge the equalizing reservoir to normal brake pipe pressure in release, and functions in service application position, to reduce the pressure in the equalizing reservoir, and in lap position to trap the pressure thus established in the equalizing reservoir. Under service and lap conditions the equalizing discharge valve responds to the pressure differential between the brake pipe and the equalizing reservoir and vents brake pipe pressure until this equalizes with the pressure in the equalizing reservoir. In the present device when the reduction of brake pipe pressure produces a deceleration rate sufficient to affect the decelerometer, the engineer's brake valve is disconnected from the brake pipe and upon further response of the decelerometer air is fed both to the brake pipe 82 and to the equalizing reservoir 81 to increase their pressures in consonance one with the other.

In Fig. 8 the brake pipe 82 is assumed to extend throughout the train and is connected by branches 83 with triple valves 84 of the graduated release type, well known in the art, only one such valve being shown. Such triple valves are commonly associated with an auxiliary reservoir 85 and a supplemental reservoir 86, which assists the related triple valve in performing its release graduating function. Each triple valve is connected by a pipe 87 with its brake cylinder 33c.

A pipe 88 leads from the equalizing reservoir 81 to a port in the seat of the decelerometer valve which is directly opposed to a port also in the seat of the decelerometer valve, through which air is supplied at reduced pressure from the main reservoir through a pressure reducing feed valve 89 and pipe 91. These two ports are indicated at 92 and 93 respectively.

The brake pipe branch connection 32c leads to the port 94 and constantly communicates with the space between the heads 35c and 36c. The pipe 17c communicates with a port 95 which is normally exposed by the head 35c.

When the inertia mass 43c responds to deceleration and shifts the valve 35c, 36c, the first effect is to blank port 95, thus disconnecting pipe 17c from brake pipe 82. Further motion of the valve connects port 93 with ports 92 and 94, thus feeding air from the main reservoir through the reducing feed valve 89 to the equalizing reservoir 81 and the brake pipe 82. Under service condition the engineer's brake valve would be in lap position after a service reduction had been made, and consequently the decelerometer acts to raise pressure in the equalizing reservoir and the brake pipe and cause a graduated release of the brakes in response to deceleration.

The initial applying pressure in the brake cylinder 33c would operate as already described with reference to Fig. 1, to subject the spring 49c to its higher stress. Consequently in the first portion of the application the deceleration would be high. However, as the train slowed and the coefficient of brake shoe friction increased, the pressure in cylinder 33c would be gradually reduced by the decelerometer and ultimately would pass a low critical value at which the stress of spring 49c is reduced, so that the train would come to rest gently.

In making an emergency application the engineer leaves his brake valve in emergency position. This would subject the pipe 15c to emergency reservoir pressure and would insure the stressing of the spring 49c to its maximum stress throughout the stop or so long as the engineer's brake valve remained in emergency position.

The embodiment of the invention in four specifically different mechanisms has been described in order to indicate the general applicability of the invention. While all these embodiments involve the use of pneumatic pressure as the brake applying force, this selection is made because of the common use of air brakes and its desirable characteristics of flexibility and ease of control. However, the invention is broadly applicable to power brakes irrespective of the motive power used, so long as such motive power be susceptible of graduation or modulation to vary the intensity of application.

What is claimed is:

1. In a braking system, the combination of power actuated braking means; a controller operable to produce service and emergency applications and release of said braking means; a modulating device responsive to the deceleration produced by a brake application and serving to modulate such application; adjusting means for said modulating device responsive to change of braking force past a critical value; and a connection between said adjusting means and said controller, whereby the controller when in a given position modifies the action of said adjusting means.

2. In a braking system, the combination of power actuated braking means; a controller operable to produce service and emergency applications and release of said braking means; a modulating device responsive to the deceleration produced by a brake application and serving to modulate such application; adjusting means for said modulating device responsive to change of vehicle speed past a critical value; and a connection between said adjusting means and said controller whereby the controller when in a given position modifies the action of said adjusting means.

3. In a braking system, the combination of power actuated braking means; a manually operable controller for applying and releasing said braking means, said controller having distinct positions for producing service and emergency applications; modulating means responsive to the rate of deceleration and serving to control the intensity of application to establish definite deceleration rates; means for adjusting said modulating means to modify the deceleration rate established thereby; means rendered active by approach to a state of rest for actuating said adjusting means; and means associated with the controller for permitting the last named means to act when the controller is in position to produce a service application, and to inhibit such action when the controller is in position to produce an emergency application.

4. In a brake system, the combination of an engineer's brake valve having a port which it alternately connects with pressure fluid supply and with exhaust as it shifts between an emergency application position and another brake applying position; a decelerometer responsive to deceleration produced by a brake application and controlling the intensity of application; and a pressure motor for adjusting the response of said decelerometer to deceleration, said motor being connected with said port.

5. In a fluid pressure brake system, the combination of an engineer's brake valve having lap, service and emergency positions; modulating means responsive to deceleration produced by a brake application and controlling the intensity of application; adjusting means responsive to vehicle speed for causing said modulating means first to establish a relatively high and then a relatively lower deceleration rate; and means including ports in said engineer's brake valve for causing said adjusting means to maintain said high deceleration rate so long as the engineer's brake valve is in emergency position.

6. In a fluid pressure brake system, the combination of an engineer's brake valve having lap, service and emergency positions; modulating means responsive to deceleration produced by a brake application and controlling the intensity of application; adjusting means responsive to reduction of braking pressure past a critical value for causing said modulating means first to establish a relatively high and then a relatively lower deceleration rate; and means including ports in said engineer's brake valve for causing said adjusting means to maintain said high deceleration rate so long as the engineer's brake valve is in emergency position.

7. In a fluid pressure brake system, the combination of an engineer's brake valve having two application positions; modulating means responsive to deceleration produced by a brake application and controlling the intensity of application; pressure actuated adjusting means for setting said modulating means to maintain one deceleration rate when said pressure actuated means is energized and another rate when it is deenergized; and means comprising ports in said brake valve and serving to energize said pressure actuated means in one application position and to permit its deenergization in the other application position.

8. In a fluid pressure brake system, the combination of an engineer's brake valve having two application positions; modulating means responsive to deceleration produced by a brake application and controlling the intensity of brake application; pressure actuated adjusting means for setting said modulating means to maintain one deceleration rate when said pressure actuated means is energized and another rate when it is deenergized; means responsive to vehicle speed for adjusting said modulating means to change the deceleration rate established thereby; and means comprising ports in said brake valve and serving to energize said pressure actuated means in one application position and to deenergize it in the other application position.

9. The combination of braking means for vehicles, including a brake cylinder; inertia means arranged to regulate the pressure in said cylinder during an application; means for adjusting said inertia means to vary its response; means responsive to brake cylinder pressure for controlling said adjusting means; and an engineer's brake valve having two brake applying positions, in one of which it inhibits the controlling action of said means responsive to brake cylinder pressure.

10. An inertia control for brakes comprising a movable inertia mass and brake controlling means operable by motion thereof; yielding means resisting such motion; means responsive to the intensity of brake application for varying the resistance offered by said yielding means; and a manually operable controller for applying and releasing said brakes, said controller having two brake applying positions, in one of which it inhibits the action of said means responsive to the intensity of brake application.

11. The combination of a brake cylinder; a movable inertia mass; admission and exhaust valve means controlling the pressure in said brake cylinder and arranged to be actuated by motion of said means; yielding means resisting such motion; means responsive to brake cylinder pressure for changing the resistance offered by said yielding means; and an engineer's brake valve having two application positions, in one of which it inhibits the action of said means responsive to brake cylinder pressure.

12. The combination of regulable braking means for a vehicle; controlling means therefor, comprising an inertia device responsive to vehicle deceleration and connected to regulate said braking means; a device responsive to vehicle speed arranged to modify the action of said inertia device; a motor actuated device arranged to modify the action of said inertia device; and a manually operable controller for applying and releasing the brakes, said controller having two brake applying positions, in one of which it energizes and in the other of which it deenergizes said motor actuated device.

13. A combined speed and inertia control for brakes, comprising in combination a movable inertia device; brake regulating means operable by motion thereof; yielding means for resisting such motion; speed responsive means for varying the resistance offered by said yielding means; motor operated means for varying the resistance offered by said yielding means; and a controller for applying and releasing the brakes, said controller having two brake applying positions, in one of which it energizes and in the other of which it deenergizes the motor of said motor operated means.

14. In an automatic fluid pressure brake system, the combination of a brake pipe; at least one braking unit including an automatic brake valve connected with said brake pipe; an engineer's brake valve of the equalizing discharge type including an equalizing reservoir, said brake valve having two brake applying positions, in one of which it vents pressure fluid from and in the other of which it admits pressure fluid to a regulatory port; valve means responsive to the deceleration produced by an application of the brakes and exercising a secondary control on the pressure in said equalizing reservoir; a pressure motor for modifying the action of the valve means responsive to deceleration; and valve means arranged to respond to brake cylinder pressure and controlling the admission and exhaust of pressure fluid to and from said motor, the exhaust port of said valve means being connected to said regulatory port of said engineer's brake valve.

CHARLES A. CAMPBELL.